US007366886B2

(12) United States Patent
Yoo

(10) Patent No.: US 7,366,886 B2
(45) Date of Patent: Apr. 29, 2008

(54) SYSTEM AND METHOD FOR AUTOMATICALLY RESETTING A DISPLAY INFORMATION IF OPTIONALLY CHANGED DISPLAY INFORMATION IS NOT SUITABLE FOR EXTENDED DISPLAY INFORMATION DATA (EDID) OF A MONITOR

(75) Inventor: Chang-woong Yoo, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 435 days.

(21) Appl. No.: 10/823,704

(22) Filed: Apr. 14, 2004

(65) Prior Publication Data

US 2004/0239676 A1 Dec. 2, 2004

(30) Foreign Application Priority Data

Jun. 2, 2003 (KR) ..................... 10-2003-0035323

(51) Int. Cl.
*G06F 9/00* (2006.01)
*G09G 5/02* (2006.01)

(52) U.S. Cl. .......................... 713/1; 713/100; 345/698

(58) Field of Classification Search .................... 713/1, 713/100; 345/698, 204
See application file for complete search history.

(56) References Cited

U.S. PATENT DOCUMENTS

| | | | | |
|---|---|---|---|---|
| 5,713,040 A | | 1/1998 | Lee | |
| 6,043,814 A | | 3/2000 | Lim | |
| 6,049,316 A | * | 4/2000 | Nolan et al. | 345/698 |
| 6,118,440 A | | 9/2000 | Tsunoda | |
| 6,223,283 B1 | * | 4/2001 | Chaiken et al. | 713/1 |
| 6,839,055 B1 | * | 1/2005 | Nguyen | 345/204 |
| 7,079,128 B2 | * | 7/2006 | Kim | 345/213 |
| 7,173,638 B2 | * | 2/2007 | Jeong | 345/690 |
| 2002/0080091 A1 | * | 6/2002 | Acharya et al. | 345/2.1 |

FOREIGN PATENT DOCUMENTS

| | | |
|---|---|---|
| JP | 7-175428 | 7/1995 |

(Continued)

OTHER PUBLICATIONS

IBM, Extended Display Identification Data Programming of Micro-processor-Based Display Data Channel Design, Mar. 1, 1995, vol. 38, Issue 3, pp. 169-172.*

*Primary Examiner*—Suresh K Suryawanshi
(74) *Attorney, Agent, or Firm*—Staas & Halsey LLP

(57) ABSTRACT

A computer system having a computer main body and a monitor displaying a video signal from the computer main body and a control method thereof. The control method includes storing a display information of the video signal displayed on the monitor based on EDID supplied from the monitor in the computer main body; determining whether the display information of an input video signal transmitted from the computer main body to the monitor is suitable for the EDID of the monitor; displaying the input video signal if the display information of the input video signal is suitable for the EDID and supplying an error signal to the computer main body if the display information of the input video signal is not suitable for the EDID; and processing the input video signal according to the display information stored in the computer main body and supplying it to the monitor if the error signal is supplied to the computer main body.

6 Claims, 6 Drawing Sheets

FOREIGN PATENT DOCUMENTS

| | | | | |
|---|---|---|---|---|
| JP | 9-134153 | | | 5/1997 |
| JP | 11-119722 | | | 4/1999 |
| JP | 2003163816 | A | * | 6/2003 |
| KR | 10-348268 | | | 7/2002 |
| KR | 2002-74347 | | | 9/2002 |
| KR | 10-359759 | | | 10/2002 |
| KR | 2002-93377 | | | 12/2002 |
| KR | 2003-6022 | | | 1/2003 |
| WO | 02/093368 | | | 11/2002 |

* cited by examiner

FIG. 4

VESA DDC EDID Version 2

| Address | No Bytes | bit | CONTENTS | REMARK |
|---|---|---|---|---|
| 00h | 1 | 7 - 4 | EDID Structure Version | |
| | | 3 - 0 | EDID Structure Revision | |
| 01h | 2 | | ID Manufacturer Name<br>TOTAL 15 BITS DIVIDED INTO EACH 5 BITS FORMING ABBREVIATION OF MANUFACTURER NAME TRANSFORMED TO CAPITALIZED LETTER | 0 xxxxx xxxxx xxxxx |
| 03h | 2 | | ID Product Code | |
| 05h | 1 | | Week of Manufacture | |
| 06h | 2 | | Year of Manufacture | |
| 08h | 32 | | Manufacturer/Product ID String | |
| : | : | | : | |

FIG. 5

| Address | No Bytes | bit | CONTENTS | REMARK |
|---|---|---|---|---|
| 00h | 1 | 7 - 4 | EDID Structure Version | |
| | | 3 - 0 | EDID Structure Revision | |
| 01h | 2 | | ID Manufacturer Name<br>TOTAL 15 BITS DIVIDED INTO EACH 5 BITS FORMING ABBREVIATION OF MANUFACTURER NAME TRANSFORMED TO CAPITALIZED LETTER | 1 01111 01111 10010<br>(Out of Sync Range) |
| 03h | 2 | | ID Product Code | |
| 05h | 1 | | Week of Manufacture | |
| 06h | 2 | | Year of Manufacture | |
| 08h | 32 | | Manufacturer/Product ID String | |
| · · | · · | | · · | |

SYSTEM AND METHOD FOR AUTOMATICALLY RESETTING A DISPLAY INFORMATION IF OPTIONALLY CHANGED DISPLAY INFORMATION IS NOT SUITABLE FOR EXTENDED DISPLAY INFORMATION DATA (EDID) OF A MONITOR

CROSS-REFERENCE TO RELATED APPLICATIONS

This application claims the benefit of Korean Patent Application No. 2003-35323 filed Jun. 2, 2003, in the Korean Intellectual Property Office, the disclosure of which is incorporated herein by reference.

BACKGROUND OF THE INVENTION

1. Field of the Invention

The present invention relates to a computer system and method of controlling the same, and more particularly, to a computer system display and method of controlling the same where an error signal is supplied to a computer main body and a video signal is automatically changed if a display information is optionally changed that it is not suitable for the Extended Display Identification Data (EDID) of a monitor.

2. Description of the Related Art

Generally, a computer system has a computer main body provided with a video card generating a video signal in a predetermined format, and a monitor processing the video signal transmitted from the video card through digital sampling, scaling or the like and then displaying a picture to be perceived by a user.

The picture displayed on the monitor differs in distinctness according to a screen resolution. The resolution depends on the efficiency of the video card and the monitor. If the resolution is changed, for example, by a resolution control menu through a property window of a display configuration of a control panel, and exceeds the resolution range the monitor can supply, a normal picture cannot be displayed on the screen of the monitor.

To solve this problem, VESA Display Data Channel (DDC) standard is established to transmit the resolution the monitor supports to the computer main body, so that the video card driver reads EDID of the monitor connected to the computer main body and only the resolution the monitor supports is selected. However, each manufacturer of the video card driver and monitor establishes the highest resolution supported differently, thereby causing a problem that a resolution the monitor does not support can be selected.

Further, if the wrong information is transmitted from the monitor to the computer main body, the resolution selected that is supposed to be supported may actually not be supported. Even if a user sets a suitable resolution, the monitor may not support the resolution established by the user due to an error generated in the video card driver, monitor circuit, microprocessor or the like.

SUMMARY OF THE INVENTION

Accordingly, it is an aspect of the present invention to provide a computer system and method of controlling the same where an error signal is supplied to a computer main body and a video signal is automatically reset if a display information is optionally changed that it is not suitable for EDID of a monitor.

The foregoing and/or other aspects of the present invention are achieved by providing a computer system comprising a computer main body and a monitor displaying a video signal from the computer main body, the computer system includes an EDID storing part provided in the monitor to store EDID of the monitor; a display information storing part provided in the computer main body to store display information of the video signal displayed on the monitor, the display information is based on the EDID; a display control part determining whether a display information of an input video signal transmitted from the computer main body to the monitor is suitable for the EDID of the monitor, displaying the input video signal if the display information of the input video signal is suitable for EDID and supplying an error signal to the computer main body if the display information of the input signal is not suitable for the EDID; and a video control part storing the display information of the video signal displayed on the monitor based on the EDID and processing the input video signal according to the display information stored in the display information storing part and to supply it to the monitor if the error signal is supplied from the display control part.

Additional aspects and/or advantages of the invention will be set forth in part in the description which follows and, in part, will be obvious from the description, or may be learned by practice of the invention.

According to an aspect of the invention, a part of the error signal is the same as a part of the EDID data.

According to an aspect of the invention, the display control part supplies the EDID to the computer main body, if the input video signal is suitable for the EDID.

The foregoing and/or other aspects of the present invention are achieved by providing a computer system having a computer main body and a monitor displaying a video signal from the computer main body, the computer system including an EDID storing part provided in the monitor to store EDID of the monitor; a display control part determining whether a display information of an input video signal transmitted from the computer main body to the monitor is suitable for the EDID of the monitor, displaying the input video signal if the display information of the input video signal is suitable for the EDID and supplying an error signal to the computer main body, if the display information of the input video signal is not suitable for the EDID; and a video control part calculating a display set-up value lower than the display information that is not suitable for the EDID, if the error signal is supplied from the display control part, processing the input video signal according to the set-up value and supplying the processed video signal to the monitor.

According to an aspect of the invention, a part of the error signal is the same as a part of the EDID data.

According to an aspect of the invention, the display control part supplies the EDID to the computer main body, if the input video signal is suitable for the EDID.

The foregoing and/or other aspects of the present invention are also achieved by providing a control method of a computer system having a main body and a monitor displaying a video signal from the main body, the control method of the computer system including storing a display information of the video signal displayed on the monitor, the video signal being based on EDID supplied from the monitor in the computer main body; determining whether the display information of an input video signal transmitted from the computer main body to the monitor is suitable for the EDID of the monitor; displaying the input video signal if the display information of the input video signal is suitable for the EDID and supplying an error signal to the computer main body if the display information of the input video signal is not suitable for the EDID; and processing the input video signal according to the display information stored in the computer main body and supplying the processed video signal to the monitor if the error signal is supplied to the computer main body.

According to an aspect of the invention, a part of the error signal is the same as EDID data.

According to an aspect of the invention, the control method of a computer system further comprises supplying the EDID to the computer main body if the input video signal is suitable for the EDID.

The foregoing and/or other aspects of the present invention are also achieved by providing a control method of a computer system having a computer main body and a monitor displaying a video signal from the computer main body, the control method of the computer system including, determining whether a display information of an input signal transmitted from the computer main body to the monitor is suitable for EDID of the monitor; displaying the input video signal if the display information of the video signal is suitable for the EDID and supplying an error signal to the computer main body if the display information of the input video signal is not suitable for the EDID; calculating a display information set-up value lower than the display information if the error signal is supplied to the computer main body; and processing the input video signal according to the set-up value and supplying the video signal to the monitor.

According to an aspect of the invention, a part of the error signal is the same as the EDID data.

According to an aspect of the invention, the control method of a computer system includes supplying the EDID to the computer main body, if the input video signal is suitable for the EDID.

BRIEF DESCRIPTION OF THE DRAWINGS

These and/or other aspects and/or advantages of the present invention will become apparent and more readily appreciated from the following description of the embodiments, taken in conjunction with the accompanying drawings of which:

FIG. 4 shows a data structure of a general EDID briefly;

FIG. 5 shows a data structure of an error signal a part of whose data is the same as the EDID of FIG. 4;

DETAILED DESCRIPTION OF THE EMBODIMENTS

Figure 1:
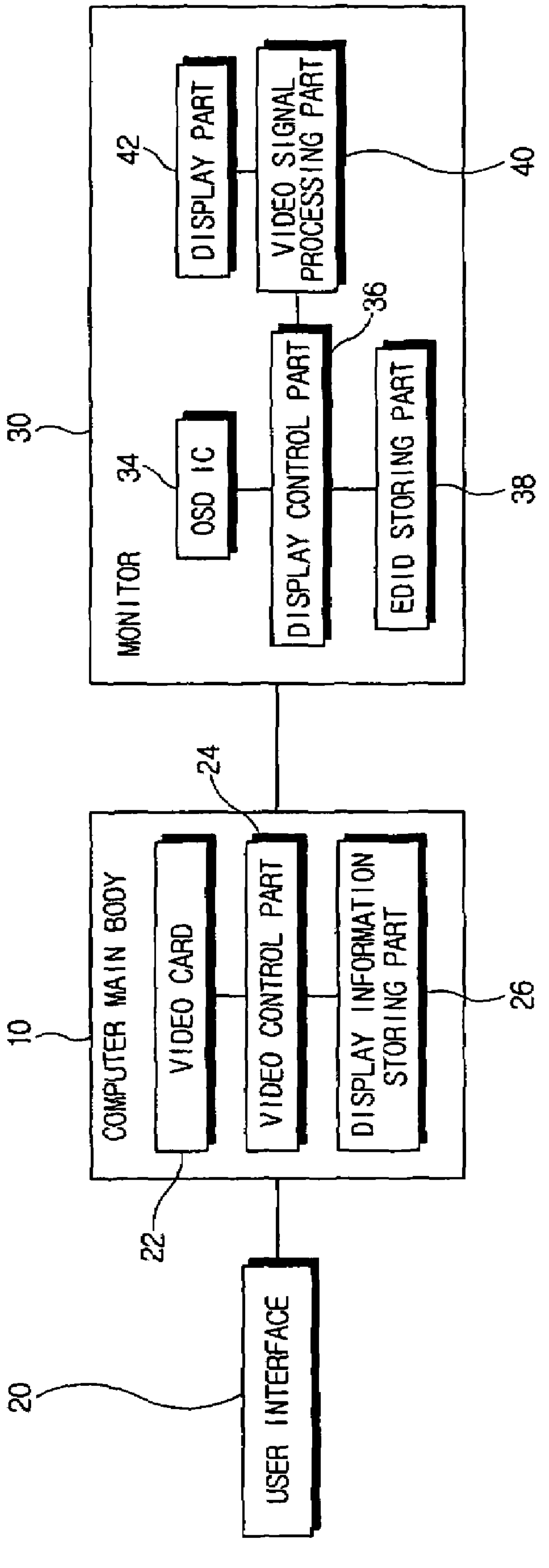
FIG. 1 is a control block diagram of a computer system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a control block view of a computer system according to an embodiment of the present invention. As shown in the drawing, the computer system includes a computer main body 10 provided with a video card 22 generating a video signal in a predetermined format, and a monitor 30 processing the video signal transmitted from the video card 22 through digital sampling, scaling or the like and then displaying a picture capable of being perceived by a user.

The computer main body 10 includes a display information storing part 26 to store display information of the video signal and a video control part 24 controlling video function. The monitor 30 includes an EDID storing part 38; an On Screen Display (OSD) Integrated Circuit (IC) generating an OSD signal; a video signal processing part 40 to process a video signal; a display part 42; and a display control part 36 to control the monitor 30 generally.

The Extended Display Identification Data (EDID) storing part 38 is an Electrically Erasable and Programmable Read Only Memory (EEPROM) inside the monitor 30 and stores EDID such as a model name of the monitor 30, a supported resolution, a recommended resolution by the manufacturer and the like required to install a driver for operating the monitor 30 in the computer main body 10. It is understood that other forms of programmable memories may be used, such as Flash Read Only Memory (FROM) or RAM with battery backup.

When the monitor 30 is connected to the computer main body 10, an operating system reads EDID stored in the EDID storing part 38 of the monitor 30 through the communication line of Display Data Channel (DDC) by means of Plug and Play (PnP) and stores the read EDID in a register and installs a suitable driver.

The installed driver of the video card 22 is employed with a video control part 24 controlling the video card 22 to form the video signal based on the EDID read from the monitor 30 and to transmit the video signal to the monitor 30. Thus, the most suitable monitor environment is set up.

A resolution the monitor 30 can support is displayed in a property window of a display configuration menu of a control panel on the operating system so that a user can change a resolution into the resolution displayed in the property window of the display configuration by using a user interface 20 such as a mouse or keyboard.

As noted in the background section above, the resolution range displayed in the property window and set up by the user may not be supported by the monitor 30. Then, the display control part 36 provided in the monitor 30 senses horizontal and vertical sync signals transmitted in the monitor 30 and determines a display mode (SVGA (Super Video Graphic Adapter, 800*600), XGA (extended Graphic Adapter, 1024*768), SXGA (Super extended Graphic Adapter, 1280*1024) etc.) and whether this display mode is suitable for EDID stored in the EDID storing part 38. If the display control part 36 determines that the display mode is suitable for the EDID, then the display control part 36 causes the input video signal to process through the video signal processing part 40 and display the input video signal in the display part 42. If the video control part 24 of the computer main body 10 gives an order to read EDID, the display control part 36 offers EDID of the monitor 30 stored in the EDID storing part 38 to the computer main body 10 as a signal of a normal state indicating that no error is generated.

Figure 6:
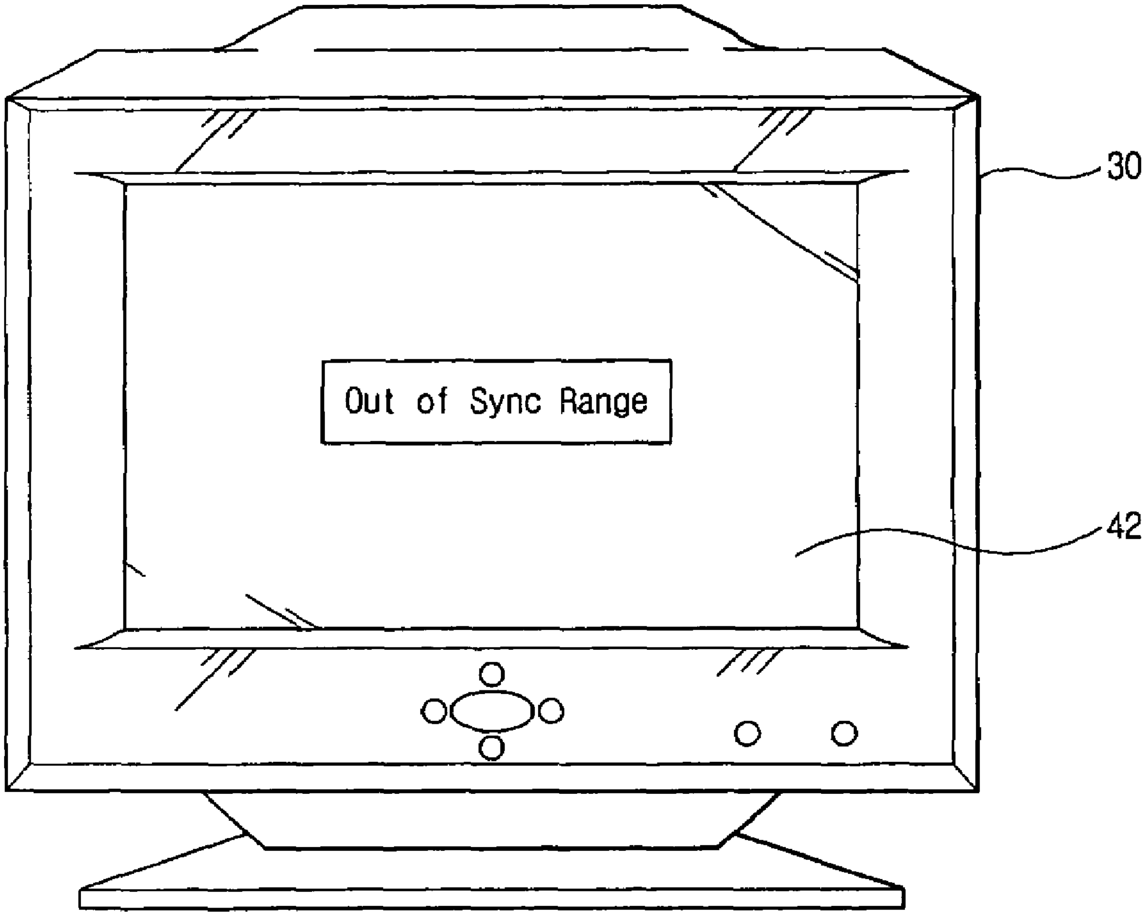
FIG. 6 shows an example of an error message according to an embodiment of the present invention.

In contrast, if the display control part 36 determines that the display mode is unsuitable based on the EDID of the monitor 30, the display control part 36 controls the OSD IC 34 to generate an OSD signal for an error message. Then, the display control part 36 controls the video signal processing part 40 to transform the OSD signal into an OSD picture to be displayed in the display part 42. FIG. 6 shows an embodiment in which such an error message is displayed. A user can perceive that no picture is displayed on the monitor 30, because the display mode of the input video signal cannot be supported by the monitor 30. If the video control part 24 of the computer main body 10 gives an order to read EDID, the display control part 36 offers an error signal to the computer main body 10.

The error signal is a signal of a state in which the display information of the video signal input from the computer main body 10 cannot be supported by the monitor 30. In this case, a part of the display information data is the same as the normal EDID of the monitor 30 stored in the EDID storing part 38 and the other part is different therefrom. Thus, only the display information data different from the normal EDID is additionally stored in the EDID storing part 38. If a part of the changed EDID is the same as the normal EDID, then the part that is the same is not stored, so that a need to increase memory capacity can be prevented.

If the computer main body 10 gives an order to read EDID, the normal and changed EDIDs are selectively transmitted to the computer main body 10 according to display information of the video signal input in the monitor 30.

FIGS. 4 and 5 show the normal EDID as a signal of a normal state and the changed EDID as a signal of an error state, respectively. Referring to the drawings, in the changed EDID, i.e., an error signal, ID Manufacturer Name stored in the address 01H of the normal EDID is changed. That is, the most significant bit is set up as 1 and 15 bit forming 3 letters of the abbreviation of the manufacturer name forms "OSR" from each of the initials "Out of Sync Range". Thus, it is distinguished from the normal EDID, i.e., the signal of the normal state. This configuration illustrates an aspect of the present invention, and is not limited to the tables shown herein.

Display information regarding the video signal displayed in the display part 42, before display information such as resolution and the like is changed through the user interface 20, is stored in the display information storing part 26 of the computer main body 10. This video signal is suitable for EDID supplied from the monitor 30, thereby being displayed in the display part 42. Further, the display information of the input video signal changed in the computer main body 10 and supplied to the monitor 30, such as a set-up value of the display information through the user interface 20 and the like, is stored in the display information storing part 26. Of course, the storing spaces for display information before and after changes are separate storing spaces. Also, a separate memory can be used to store default display information and changed display information.

The video control part 24 causes the current display information of the video signal displayed on the monitor 30 before the display information is changed to be stored in the display information storing part 26 and orders the display control part 36 to read EDID from the EDID storing part 38. The video control part 24 controls the video signal processing according to the current display information stored in the display information storing part 26 before the display information is changed and to supply it to the monitor 30, if an error signal is offered to the display control part 36 at the order to read EDID.

The video control part 24 stores the display information of the input video signal changed through the user interface 20 and reconstitutes the property window of the display configuration to make the menu choice of the display information, causing an error signal to be deactivated, thereby preventing a user from resetting the unsuitable display information for EDID of the monitor 30.

A signal transmission between the computer main body 10 and the monitor 30 can be achieved also by a conventional video signal transmission port such as D-Sub cable or DVI (Digital Video Interface) cable.

Figure 2:
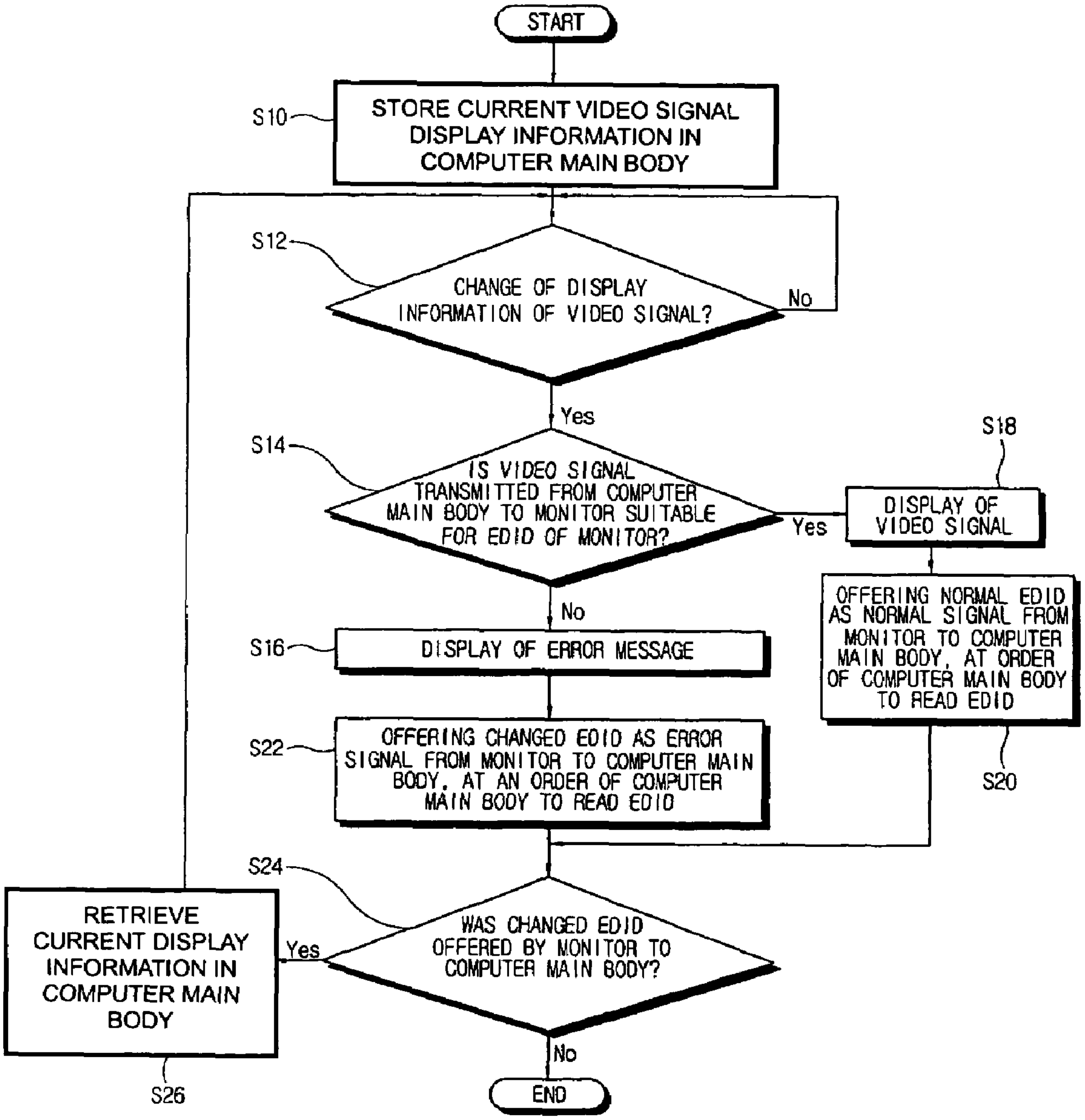
FIG. 2 is a control flow chart of the computer system according to an embodiment of the present invention.

With this configuration, the computer system is controlled as shown in FIG. 2. The video control part 24 of the computer system stores the display information of the video signal displayed on the monitor 30 before the display information has been changed in the display information storing part 26 S10.

A user determines whether to change the display information of the video signal displayed in the display part 42 in operation S12. If the user wants to change the display information, the user should open the property window of the Graphical User Interface (GUI) display configuration control panel on the operating system through the user interface 20.

If the display information is changed through the property window, the display control part 36 determines whether the video signal transmitted from the computer main body 10 to the monitor 30 is suitable for EDID stored in the EDID storing part 38 of the monitor 30 in operation S14.

If the display control part 36 determines that the video signal is suitable for EDID, the display control part 36 makes the video signal process through the video signal processing part 40 at the new display setting and displays the processed video signal in the display part 42 in operation S18. Further, if the video control part 24 sends a signal to read EDID, the display control part 36 supplies the normal EDID as a normal signal to the computer main body 10 in operation S20. However, if the display control part 26 determined that the video signal is unsuitable for EDID, the display control part 36 makes the display part 42 display an error message in operation S16. If the video control part 24 sends the signal to read EDID, the display control part 36 reads the changed EDID in the EDID storing part 38 and supplies it as an error signal to the computer main body 10 in operation S22.

The video control part 24 determines whether the changed EDID or the normal EDID is supplied from the monitor 30 in operation S24. If the video control part 24 determines that the changed EDID is supplied, the video control part 24 gets the current display information stored in the display information storing part 26 before the display information was changed. Then, the process returns to operation S12 and the process described above is repeated to determine whether the current display information the video control part 24 receives is suitable for the normal EDID.

If the display information is changed so that it is unsuitable for EDID of the monitor 30, the display information can be automatically reset according to the previous display information .

The video control part 24 makes the display information menu selection generating the error signal deactivated on the property window of the GUI display configuration, thereby preventing the display information from being optionally changed by a user into the display information generating an error signal because of the unsuitability of the EDID of the monitor 30.

In the embodiment described above, the video control part 24 is the video card 22 driver stored in the ROM (Read Only Memory) of the video card 22. Alternatively, the video control part 24 may be the VGA (Video Graphics Adapter) BIOS (Basic Input Output System). Here, the VGA BIOS is stored in the ROM, so that the current display information cannot be stored therein.

It may occur that the video control part 24 cannot store the current display information in the display information storing part 26, because of the inability to store the display information due to the VGA BIOS ROM or because of a storing error of the video card 22 driver. That is, the current display information stored at operation S26 of FIG. 2 cannot be stored and read.

Figure 3:
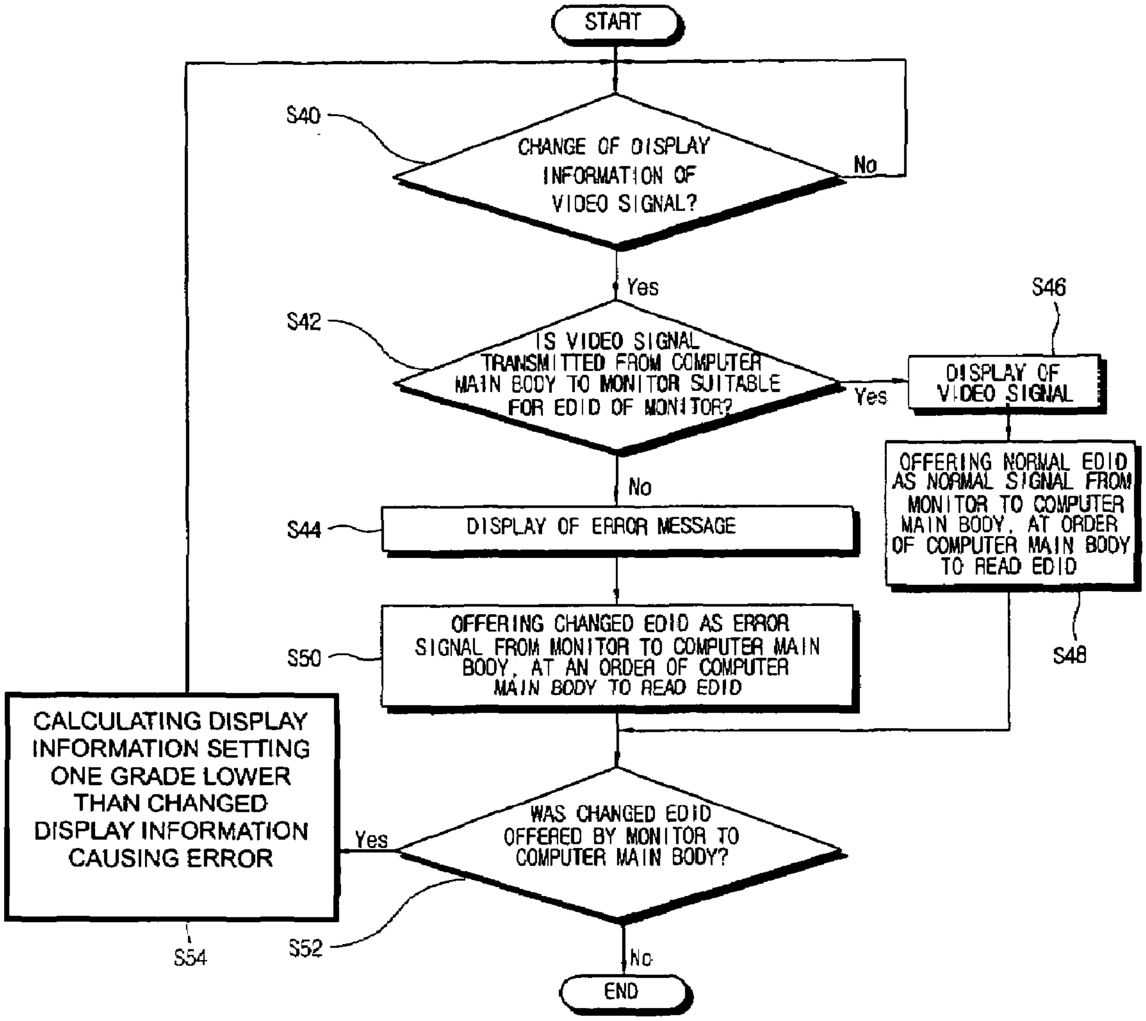
FIG. 3 is a control flow chart if current display information cannot be stored in FIG. 2.

FIG. 3 is a control flow chart for such a case. Because operations S40~S52 of FIG. 3 are the same as operations S12~S24 of FIG. 2, a repetitive description will be avoided. If the monitor 30 supplies a changed EDID to the computer main body 10 at operation S52, the video control part 24 calculates a set-up value one grade lower than the display information selection that resulted in an error signal in operation S54. Then, the process returns to operation S40 and the process described above is repeated to determine whether the set-up value is suitable for the normal EDID.

Thus, even if the current display information is not stored in the display information storing part 26, the display information can be changed so that it is suitable for the normal EDID of the monitor 30.

In the embodiment described above, because a part of the changed EDID data is the same as the normal EDID data, only the different part of the EDID data is additionally stored. However, the normal and the changed EDID may both be stored respectively and the display control part 36 may change data bit of the normal EDID at every case of error generated by using only the stored normal EDID.

In the description described above, the normal signal refers to the normal EDID and the error signal refers to the changed EDID, but it is not limited to herein.

Moreover, in the embodiment described above, the display information that causes an error signal is changed by a user, but it is not limited to herein.

In the present invention, if the new display information that was changed is not suitable for EDID of the monitor due to manufacturing errors, an error signal is supplied to the computer main body and the video signal can be automatically restored according to the current display information.

As described above, the present invention provides the computer system and control method thereof where the error signal is supplied to the computer main body and the video signal may be automatically changed according to the display information before changed, if EDID of the monitor is optionally changed to a setting that it is not suitable for the EDID of the monitor.

Further, the present invention provides the computer system and control method thereof where the video signal unsuited for the EDID of the monitor can be automatically changed without additional circuitry.

Further, the present invention provides the computer system and control method thereof where the error signal is offered to the computer main body and the video signal is automatically changed into the display information one grade lower than the error signal causing display information.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A control method of a computer system including a main body and a monitor displaying a video signal from the main body, the control method of the computer system comprising:

storing a display information of the video signal displayed on the monitor, wherein the display information is based on Extended Display Identification Data (EDID) supplied from the monitor in the main body;

determining whether the display information of the input video signal transmitted from the main body to the monitor is suitable for the EDID of the monitor;

displaying the input video signal if determined that the display information of the input video signal is suitable for the EDID and supplying an error signal to the main body if determined that the display information of the input video signal is not suitable for the EDID;

processing the input video signal according to the display information stored in the main body and supplying the processed video signal to the monitor if the error signal is supplied to the computer main body, wherein a part of the error signal is the same as a part of the EDID; and updating the storing the display information with an error EDID when the transmitted display information of the input video signal is not suitable for the EDID.

2. The control method of the computer system according to claim 1, further comprising supplying the EDID to the main body if determined that the display information of the input video signal is suitable for the EDID.

3. A computer system including a computer main body and a monitor displaying a video signal from the computer main body, the computer system comprising:

an Extended Display Identification Data (EDID) storing part provided in the monitor to store EDID of the monitor;

a display information storing part provided in the computer main body to store a display information of the video signal displayed on the monitor, the display information being based on the EDID;

a display control part determining whether the display information of the input video signal transmitted from the computer main body to the monitor is suitable for the EDID of the monitor, displaying the input video signal if the display information of the input video signal is suitable for EDID and supplying an error signal to the computer main body if the display information of the input signal is not suitable for the EDID; and a video control part storing the display information of the video signal displayed on the monitor in the display information storing part, wherein the display information is based on the EDID and processing the input video signal according to the display information stored in the display information storing part and to supply the processed video signal to the monitor if the error signal is supplied from the display control part, wherein a part of the error signal is the same as a part of the EDID, and the EDID storing part is updated with an error EDID when the transmitted display information of the input video signal is not suitable for the EDID.

4. The computer system according to claim 3, wherein the display control part supplies the EDID to the computer main body, if the input video signal is suitable for the EDID.

5. A computer system comprising a computer main body and a monitor displaying a video signal from the computer main body, the computer system comprising:

an Extended Display Identification Data (EDID) storing pad provided in the monitor to store EDID of the monitor;

a display control pad determining whether a display information of the input video signal transmitted from the computer main body to the monitor is suitable for the EDID of the monitor, displaying the input video signal if the display information of the input video signal is suitable for the EDID, and supplying an error signal to the computer main body, if the display information of the input video signal is not suitable for the EDID; and a video control pad calculating a display set-up value lower than the display information transmitted, if the error signal is supplied from the display control part, processing the input video signal according to the set-up value and supplying the processed video signal to the monitor, wherein a part of the error signal is the same as a pad of the EDID, and the error signal updates the EDID in the EDID storing part to result in an error EDID when the transmitted display information of the input video signal is not suitable for the EDID.

6. The computer system according to claim 5, wherein the display control pad supplies the EDID to the computer main body, if the input video signal is suitable for the EDID.

* * * * *

UNITED STATES PATENT AND TRADEMARK OFFICE

CERTIFICATE OF CORRECTION

PATENT NO. : 7,366,886 B2
APPLICATION NO. : 10/823704
DATED : April 29, 2008
INVENTOR(S) : Chang-Woong Yoo It is certified that error appears in the above-identified patent and that said Letters Patent is hereby corrected as shown below:

Column 8, Line 66, change “pad” to --part--.

Column 9, Line 1, change “pad” to --part--.

Column 9, Line 10, change “pad” to --part--.

Column 10, Line 3, change “pad” to --part--.

Column 10, Line 10, change “pad” to --part--.

Signed and Sealed this

Twenty-sixth Day of August, 2008

JON W. DUDAS
*Director of the United States Patent and Trademark Office*